United States Patent
Do et al.

(10) Patent No.: US 8,489,664 B2
(45) Date of Patent: Jul. 16, 2013

(54) SINGLE CLOCK CYCLE FIRST ORDER LIMITED ACCUMULATOR FOR SUPPLYING WEIGHTED CORRECTIONS

(75) Inventors: Viet Linh Do, Carlsbad, CA (US); Wei Fu, San Diego, CA (US); Arash Farhoodfar, San Diego, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 1048 days.

(21) Appl. No.: 12/399,861

(22) Filed: Mar. 6, 2009

(65) Prior Publication Data

US 2009/0172070 A1 Jul. 2, 2009

Related U.S. Application Data

(63) Continuation-in-part of application No. 11/954,325, filed on Dec. 12, 2007.

(51) Int. Cl.
*G06F 11/00* (2006.01)
(52) U.S. Cl.
USPC .......................... 708/530; 708/650; 708/671
(58) Field of Classification Search
None
See application file for complete search history.

(56) References Cited

U.S. PATENT DOCUMENTS

| 4,866,653 A | * | 9/1989 | Kulisch et al. ............... 708/603 |
| 4,998,072 A | * | 3/1991 | Sheffer ......................... 327/106 |
| 5,042,001 A | * | 8/1991 | Brightman et al. ........... 708/490 |

OTHER PUBLICATIONS

Kozak et al., "A pipelined Noise Shaping Coder for Fractional-N Frequency Synthesis", IEEE Transactions on Instrumentation and Masurement, vol. 50, No. 5, Oct. 2001, p. 1154-1161.

* cited by examiner

*Primary Examiner* — Michael D Yaary

(57) ABSTRACT

A method is provided for first order accumulation in a single clock cycle. The method accepts a limited gain value and an accumulated value stored in a previous clock cycle. Using combinational logic, the limited gain value is summed with the accumulated value. If the summed value is between upper and lower limits, a non-weighted correction signal is supplied, and the summed value is the storage value. If the summed value is greater than the upper limit, a positive weighting is supplied, the (upper limit+1) is subtracted from the summed value, and the result is the storage value. If the summed value is less than the lower limit, then a negative weighting is supplied, the lower limit is subtracted from the summed value, and the result is the storage value. The storage value is loaded in memory for use as the accumulated value in the subsequent clock cycle.

21 Claims, 8 Drawing Sheets

| Mode | total_contribution[4:0] | total_contribution values |
|---|---|---|
| First Order | $contribution1 = c_1[n]$ | 0,1 |
| Second Order | $contribution1 + contribution2 = c_1[n] + c_2[n] - c_2[n-1]$ | -1,0,1,2 |
| Third Order | $contribution1 + contribution2 + contribution3 =$ $c_1[n] + c_2[n] - c_2[n-1] + c_3[n] - 2c_3[n-1] + c_3[n-2]$ | -3,-2,-1,0,1,2,3,4 |
| Fourth Order | $contribution1 + contribution2 + contribution3 + contribution4 =$ $c_1[n] + c_2[n] - c_2[n-1] + c_3[n] - 2c_3[n-1] + c_3[n-2] +$ $c_4[n] - 3c_4[n-1] + 3c_4[n-2] - c_4[n-3]$ | -7,-6,-5,-4,-3,-2, -1,0,1,2,3,4,5,6,7,8 |

FIG. 2
*(Prior Art)*

SINGLE CLOCK CYCLE FIRST ORDER LIMITED ACCUMULATOR FOR SUPPLYING WEIGHTED CORRECTIONS

RELATED APPLICATIONS

This application is a continuation-in-part of a pending application entitled, FLEXIBLE ACCUMULATOR FOR RATIONAL DIVISION, invented by Do et al., Ser. No. 11/954,325, filed Dec. 12, 2007. This application is incorporated herein by reference.

BACKGROUND OF THE INVENTION

1. Field of the Invention

This invention generally relates to error signal accumulation and, more particularly, to a system and method to perform a first order accumulation of an error signal in a single clock cycle.

2. Description of the Related Art

FIG. 1 is a schematic block diagram depicting an accumulator circuit capable of performing a division operation (prior art). As noted in "A Pipelined Noise Shaping Coder for Fractional-N Frequency Synthesis", by Kozak et al., IEEE Trans. on Instrumentation and Measurement, Vol. 50, No. 5, October 2001, the depicted $4^{th}$ order device can be used to determine a division ratio using an integer sequence.

The carry outs from the 4 accumulators are cascaded to accumulate the fractional number. The carry outs are combined to reduce quantization noise by adding their contributions are follows:

contribution $1 = c1[n]$;

contribution $2 = c2[n] \cdot c2[n-1]$;

contribution $3 = c3[n] \cdot 2c3[n-1] + c3[n-2]$;

contribution $4 = c4[n] \cdot 3c4[n-1] + 3c4[n-2] - c4[n-3]$;

where n is equal to a current value, and (n−1) is the previous value.

FIG. 2 shows the contributions made by the accumulator depicted in FIG. 1 with respect to order (prior art). A fractional number is a number that expresses a ratio of a numerator divided by a denominator. Some fractional numbers are rational—meaning that the numerator and denominator are both integers. With an irrational number, either the numerator or denominator is not an integer (e.g., π). Some rational numbers cannot be resolved (e.g., 10/3), while other rational numbers may only be resolved using a large number of decimal (bit) places. In these cases, or if the fractional number is irrational, a long-term mean of the integer sequence must be used as an approximation.

The bottleneck in many controllers, such as a digital phase detector voltage controlled oscillator (VCO) controller used in a clock and data recovery (CDR) device, is the latency of feedback loop. Since the latency of the feedback loop determines the performance of CDR locking, tracking, and jitter, the feedback design must keep the latency as low as possible. The inherent latency of conventional digital circuitry limits the use of purely digital oscillator circuitry to relatively low frequencies.

Parent application, entitled FLEXIBLE ACCUMULATOR FOR RATIONAL DIVISION, Ser. No. 11/954,325, discloses an accumulator able to generate rational number quotients. However, as with conventional designs, the accumulated result is created over the course of several cook cycles.

It would be advantageous if an accumulator could minimize latency by creating a first order result in a single clock cycle.

SUMMARY OF THE INVENTION

Disclosed herein is a system and method for first order accumulation performed in a single clock cycle, which may also be referred to as sigma-delta modulation. The accumulator may be used, for example, with a numerically controlled oscillator to achieve the lowest possible 1-cycle latency, where 1/(1-cycle) is the clock frequency of the digital feedback loop, permitting optimal update resolution in the feedback loop of a clock and data recovery (CDR) system.

Accordingly, a method is provided for first order accumulation of an error in a single clock cycle. The method accepts a limited gain value, or error signal, and an accumulated value, which was stored in a previous clock cycle. The following operations then occur in a first (single) clock cycle using combinational logic. The limited gain value is summed with the accumulated value, creating a summed value. The summed value is examined, and if the summed value is between an upper limit and a lower limit, then a non-weighted correction signal is supplied, and the summed value is selected as the storage value. If the summed value is greater than the upper limit, then a positive weight correction signal is supplied, the (upper limit+1) is subtracted from the summed value (creating a first difference), and the first difference is selected as the storage value. If the summed value is less than the lower limit, then a negative weight correction signal is supplied, the lower limit is subtracted from the summed value (creating a second difference), and the second difference is selected as the storage value. The first clock cycle operations end with the loading the storage value in memory for use as the accumulated value in a second clock cycle, subsequent to the first clock cycle.

Additional details of the above-described method and a system for the first order accumulation of an error in a single clock cycle are presented below.

BRIEF DESCRIPTION OF THE DRAWINGS

FIG. 2 shows the contributions made by the accumulator depicted in FIG. 1 with respect to order (prior art).

DETAILED DESCRIPTION

Figure 1:
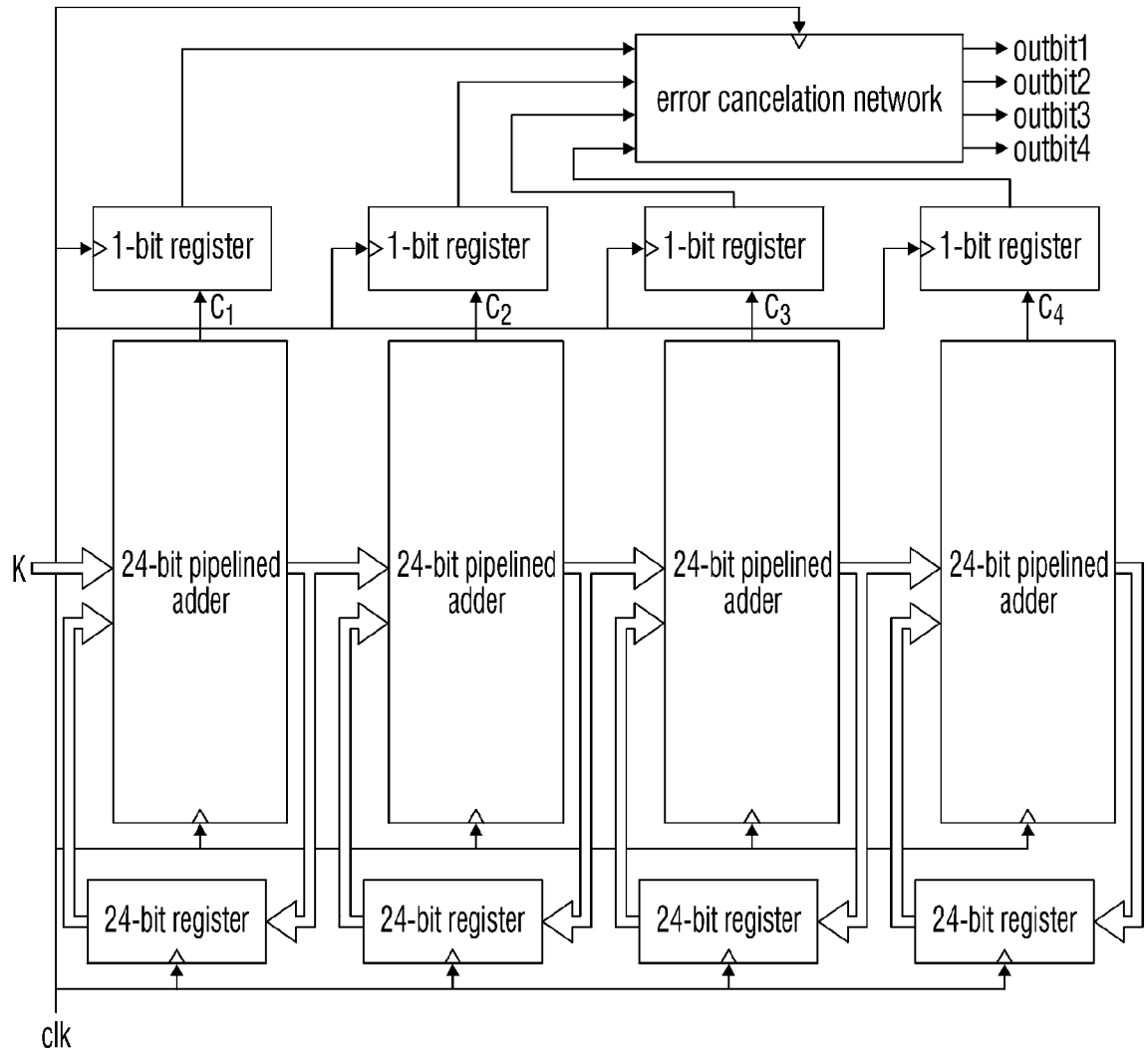
FIG. 1 is a schematic block diagram depicting an accumulator circuit capable of performing a division operation (prior art).
Figure 3:
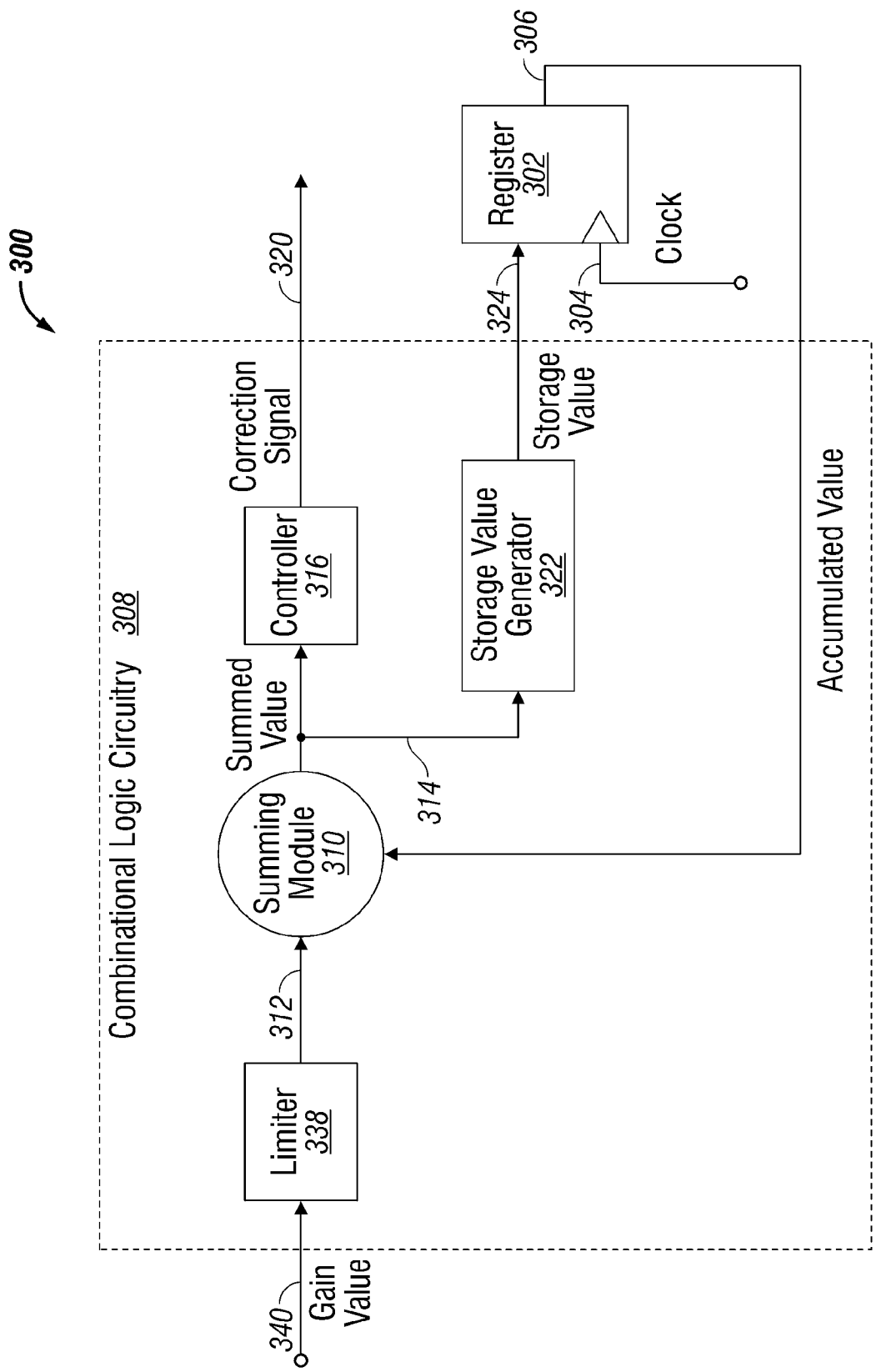
FIG. 3 is a schematic block diagram of a system for the first order accumulation of an error in a single clock cycle.

FIG. 3 is a schematic block diagram of a system for the first order accumulation of an error in a single clock cycle. The system 300 comprises a register 302 having an input on line 304 to accept a clock pulse defining the start of a first clock cycle. The register may be a flip-flop or a similar one-bit memory device. In response to the clock pulse, the register 302 supplies an accumulated value stored in a previous clock cycle at an output on line 306. The register 302 may be enabled as a bank of parallel registers in the case of a multi-bit accumulated value.

The system also includes combinational logic circuitry 308. In combinational logic, the output of one function acts as the input to a second functions. Unlike sequential logic (i.e. register 302), these functions are preformed without the aid of a clock. Alternately stated, sequential logic is combinational logic with a memory. AND, NAND, and OR gates are some examples of conventional combinational logic devices.

The combinational logic circuitry 308 includes a summing module 310 having an input on line 312 to accept a limited gain value and an input on line 306 to accept the accumulated value. The summing module has an output on line 314 to supply a summed value equal to the sum of the limited gain value and the accumulated value. The summing circuit may be enabled as a combination of AND, NAND, OR, and NOR gates, or their equivalent, as would be known in the art. The performance of summing and subtraction operations using combinational logic is well known in the art, and there are many design variations that a practitioner in the art may use to enable these operations.

A controller 316 has an input on line 314 to accept the summed value, and an output on line 320 to supply a correction signal. The controller 316 supplies a non-weighted correction signal if the summed value is either less than, or equal to an upper limit or greater than, or equal to a lower limit. The controller 316 supplies a positive weight correction signal if the summed value is greater than the upper limit, and supplies a negative weight correction signal if the summed value is less than the lower limit.

A storage value generator 322 has an input on line 314 to accept the summed value and an output on line 324 to supply a storage value as follows. A storage value is supplied that is equal to the summed value, if the summed value is either less than, or equal to the upper limit or greater than, or equal to the lower limit. A storage value is supplied equal to the (upper limit+1) subtracted from the summed value if summed value is greater than the upper limit. A storage value is supplied equal to the lower limit subtracted from the summed value if summed value is less than the lower limit.

In one aspect, the combinational logic circuitry 308 further includes a limiter 338 having an input to accept the gain value, and an output to supply a gain value less than, or equal to the upper limit and greater than, or equal to the lower limit.

In another aspect, the summing module 310 accepts an x-bit binary number gain value on line 312 and supplies an (x+1)-bit binary number summed value on line 314. Alternately stated, the limited gain value may be expressed as $2^X$ and the summed value as $2^{(X+1)}$. Further, the limited gain value may be a two's complement x-bit binary number gain value with a sign bit in the most significant bit (MSB) position, while the summed value is a two's complement (x+1)-bit binary number summed value with a sign bit in the MSB position. Likewise, the upper and lower limits are both two's complement x-bit binary number with a sign bit in the MSB position.

The two's complement of a binary number is defined as the value obtained by subtracting the number from a large power of two and adding 1. Thus, an N-bit two's complement number is found by adding 1 to $2^N$. Negative numbers are represented by the two's complement of the absolute value. A two's-complement system has the advantage of not requiring that the addition and subtraction circuitry examine the signs of the operands to determine whether to add or subtract. This property makes the system both simpler to implement and capable of easily handling higher precision arithmetic.

The controller 316 examines the binary values in the two most significant bit positions in the summed value. More explicitly, the controller supplies a correction signal comprising the two most significant bits of the summed value. A non-weighted signal is supplied if the 2 MSBs of the summed value are either "00" or "11". A positive weight correction signal is supplied if the 2 MSBs of the summed value are "01", and a negative weight correction signal is supplied if the 2 MSBs of the summed value are "10".

The register 302 accepts a second clock pulse on line 304 that defines the start of a second clock cycle, and supplies the accumulated value stored in the first clock cycle. The combinational logic circuitry 308, performs the operations of summing a new limited gain value with the accumulated value, comparing the summed value to the upper and lower limits, supplying a correction signal, and supplying the storage value, as described above. Then, the register 302 finishes the second clock cycle by loading the storage value for use as the accumulated value in a third clock cycle, subsequent to the second clock cycle.

Functional Description

Figure 4:
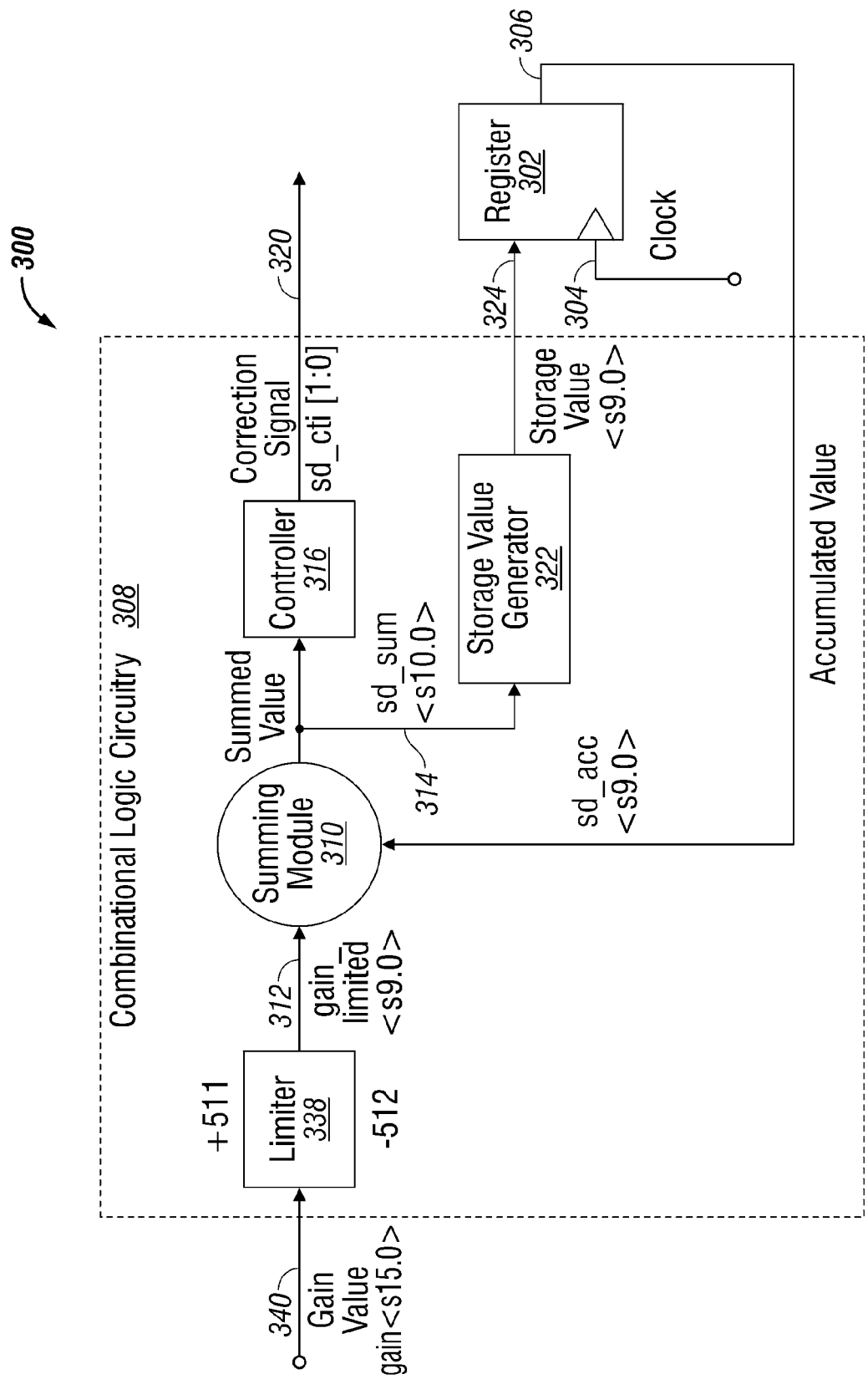
FIG. 4 is a schematic block diagram depicting a specific variation of the system generally described in FIG. 3.

FIG. 4 is a schematic block diagram depicting a specific variation of the system generally described in FIG. 3. In this aspect, the limited gain value (gain_limited <s9.0>), the accumulated value (sd_acc <s9.0>), and the upper limit (upb <s10.0>)+511 are 10-bit two's complement binary numbers. The lower limit (lwb <s10.0>)−512 and summed value (sd_sum <s10.0>) are 11-bit two's complement binary numbers. The correction signal (sd_cti [1:0]) is a 2-bit binary number (bit positions 1 and 0), with no sign. However, the correction signal may be additionally weighted with an offset or multiplying factor, not shown.

Figure 8:
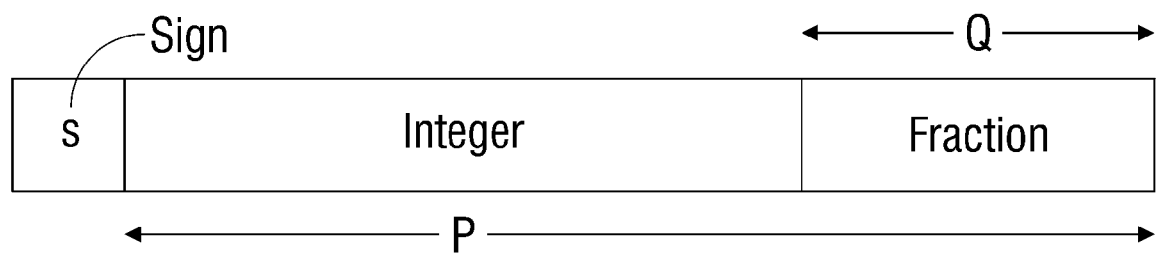
FIG. 8 is a diagram detailing the number notation used in FIG. 4.

FIG. 8 is a diagram detailing the number notation used in FIG. 4. The notation "<sP.Q>" represents a binary number where the MSB is the sign bit, followed by P bits representing an integer and fraction, where Q is the number of bits representing the fraction. For simplicity, Q=0 in all the examples presented herein. A value of the number in a particular bit position is represented with the use of "[M]". Thus, M is the bit value of the number in the Mth bit position. The symbol "[M:N]" represents the binary value in the bit positions from the Mth bit position to the Nth bit position. The symbol "~gain [M]" means that the bit value of the number in the Mth bit position in the "gain" signal is inverted.

Figure 7:
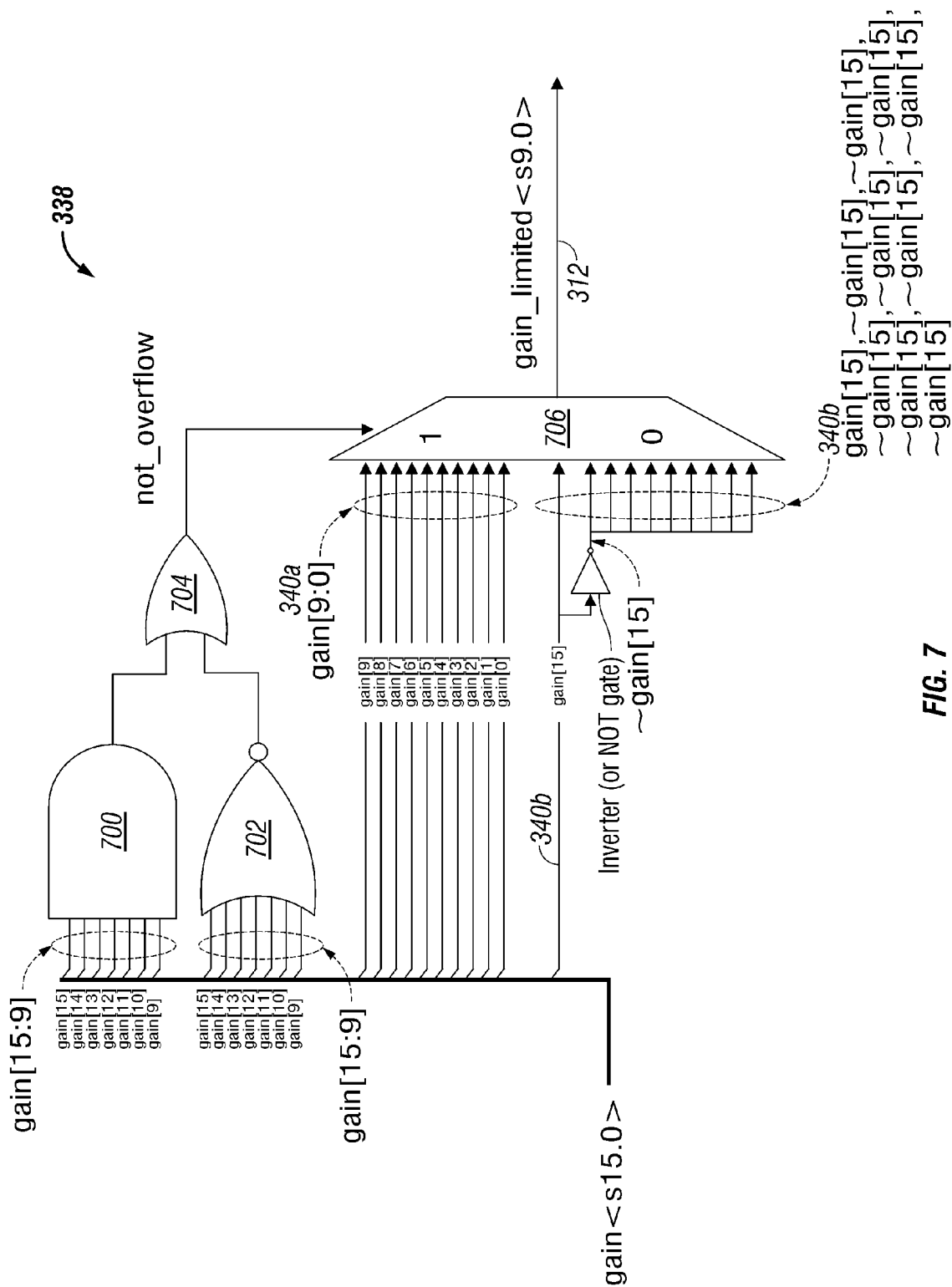
FIG. 7 is a more detailed depiction of the limiter shown in FIG. 4.

FIG. 7 is a more detailed depiction of the limiter shown in FIG. 4. A 7-input AND gate 700 and a 7-input NOR gate 702 are connected to gain[15:9]. A 2-input OR gate 704 is connected to the outputs from 700 and 702. The output of 704, not_overflow, is used to control the MUX 706. The gain_limited signal output by the MUX 706 on line 312 is defined as following. If the not_overflow signal is "1" (True) then gain_limited <s9.0> is equal to gain[9:0]. If the not_overflow signal is "0" (False), then the MSB of gain_limited<s9.0> is set equal to gain[15] and all the bits of gain_limited <s9.0> (gain_limited [8:0]) are set equal to inverted gain[15] (gain ~[15]).

Figure 5:
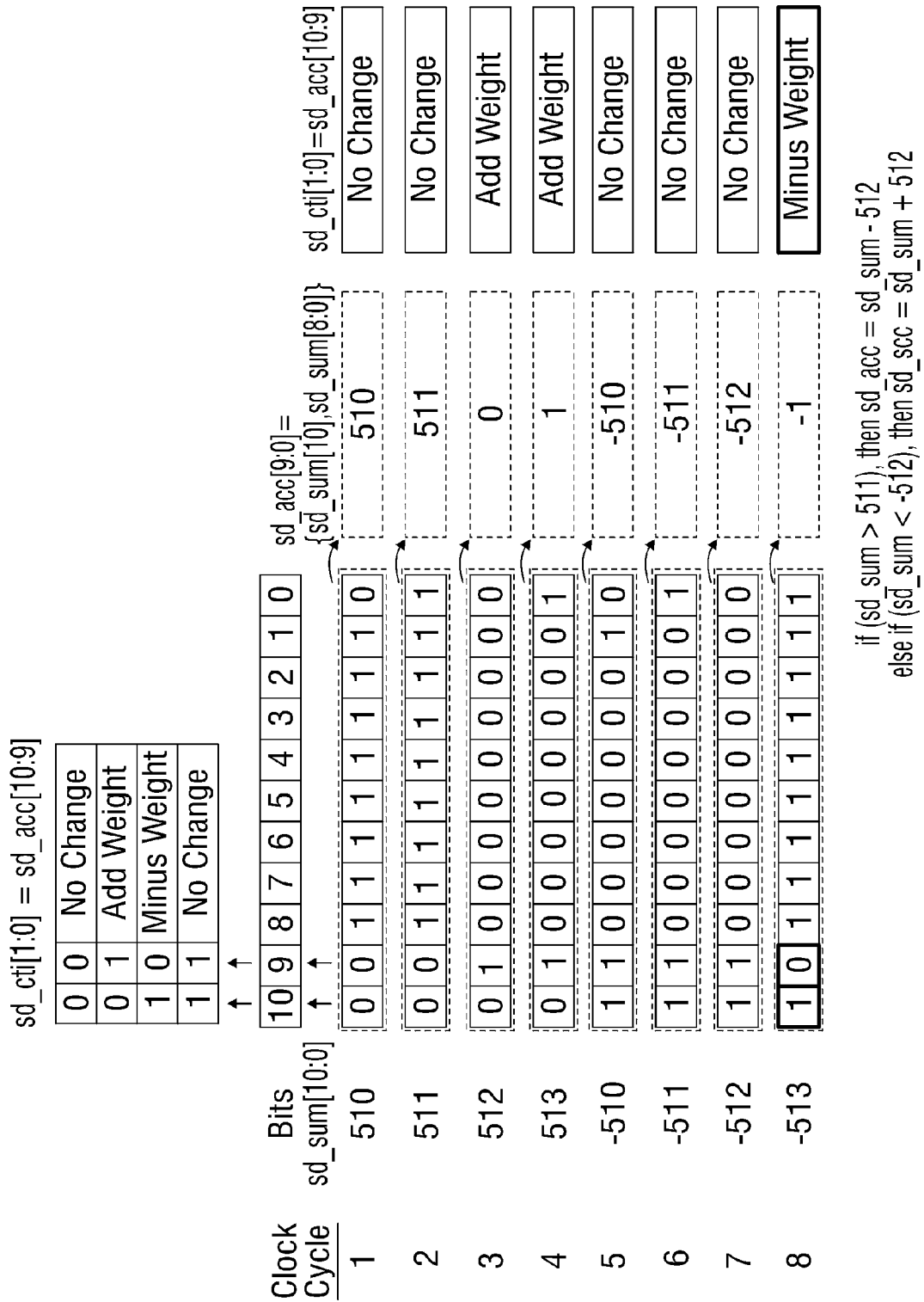
FIG. 5 is a diagram depicting some exemplary operations as performed by the controller of FIG. 4.

FIG. 5 is a diagram depicting some exemplary operations as performed by the controller of FIG. 4. The correction signal is derived from the bit values of the 2 MSBs of the summed value (sd_sum). If the two MSBs are "00" or "11", no change in weighting is applied. If the 2 MSBs are "01", weight is added to the correction signal (a positive weight), and if the MSBs are "10" weighting is decreased (a negative weight).

For example, in clock cycles 1 and 2, the 2 MSBs of the summed value are "00", so no weighting is applied, and the summed value is used as the accumulated value in the subsequent clock cycle. Alternately stated, the value in the $9^{th}$ bit position (i.e. "0") is replaced with the value in the $10^{th}$ bit position (i.e. "0"). In clock cycles 3 and 4, the 2 MSBs of the summed values are "01", so a positive weight is added to the correction signal, and the accumulated value is found by subtracting 512 (upper limit+1) from the summed value. Alternately stated, the value in the $9^{th}$ bit position (i.e. "1") is replaced with the value in the $10^{th}$ bit position (i.e., "0"). In clock cycles 5, 6, and 7, the 2 MSBs of the summed value are "11", so no weighting is applied, and the summed value is used as the accumulated value in the subsequent clock cycle. Alternately stated, the value in the $9^{th}$ bit position (i.e. "1") is replaced with the value in the $10^{th}$ bit position (i.e. "1"). In clock cycle 8, the 2 MSBs of the summed values are "10", so a negative weight is added to the correction signal, and the accumulated value is found by subtracting −512 (lower limit) from the summed value. Alternately stated, the value in the $9^{th}$ bit position (i.e. "0") is replaced with the value in the $10^{th}$ bit position (i.e. "1").

Figure 6:
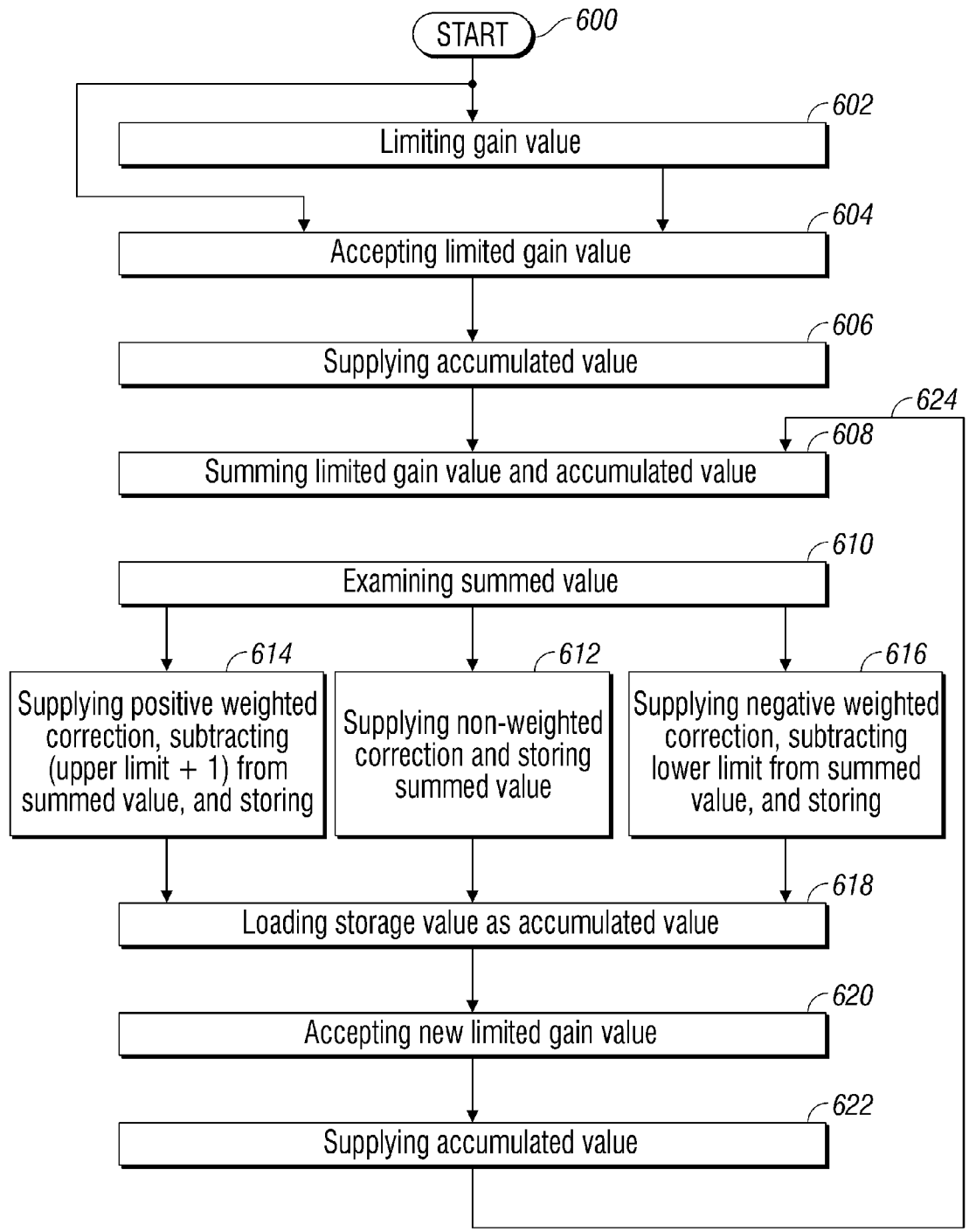
FIG. 6 is a flowchart illustrating a method for first order accumulation of an error in a single clock cycle.

FIG. 6 is a flowchart illustrating a method for first order accumulation of an error in a single clock cycle. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 600.

Step 604 accepts a limited gain value. In a first clock cycle, Step 606 supplies an accumulated value stored in a previous clock cycle. Combinational logic is used to perform Steps 608 through 618. Step 608 sums the limited gain value with the accumulated value, creating a summed value. Step 610 examines the summed value. If the summed value is between an upper limit and a lower limit, Step 612 supplies a non-weighted correction signal, and selects the summed value as the storage value. If the summed value is greater than the upper limit, Step 614 supplies a positive weight correction signal, subtracts the (upper limit+1) from the summed value, creating a first difference, and selects the first difference as the storage value. If the summed value is less than the lower limit, Step 616 supplies a negative weight correction signal, subtracts the lower limit from the summed value, creating a second difference, and selects the second difference as the storage value. Step 618 finishes the first clock cycle by loading the storage value in memory for use as the accumulated value in a second clock cycle, subsequent to the first clock cycle.

In one aspect, prior to summing the limited gain value with the accumulated value, Step 602 limits the gain to a value less than, or equal to the upper limit and greater than, or equal to the lower limit. Step 602 is performed using combinational logic.

In another aspect, the limited gain value is an x-bit binary number, and the summed value is an (x+1)-bit binary number. Further, the limited gain value is a two's complement x-bit binary number with a sign bit in the MSB position, the summed value is a two's complement (x+1)-bit binary number with a sign bit in the MSB position. The upper limit is a two's complement x-bit binary number with a sign bit in the MSB position and the lower limit is a two's complement x-bit binary number with a sign bit in the MSB position.

In this aspect, examining the summed value in Step 610 includes examining the binary values in the 2 most significant bit positions of the summed value. Also is this aspect, supplying the correction signal in Steps 612, 614, and 616 includes supplying a correction signal comprising the binary values in the two most significant bit positions of the summed value.

More explicitly, Step 612 supplies a non-weighted signal if the 2 MSBs of the summed value are either "00" or "11". Step 614 supplies a positive weight correction signal if the 2 MSBs of the summed value are "01". Step 616 supplies a negative weight correction signal if the 2 MSBs of the summed value are "10".

Step 620 accepts a new limited gain value. In the second clock cycle, Step 622 supplies the accumulated value stored in the first clock cycle. As represented by feedback arrow 624, combinational logic is used to perform the operations of summing the new limited gain value with the accumulated value, comparing the summed value to the upper and lower limits, supplying a correction signal, selecting a storage value, and finishing the second clock cycle by loading the storage value in memory for use as the accumulated value in a third clock cycle, subsequent to the second clock cycle. That is, Steps 608 through 618 are repeated in a second iteration.

A system and method have been provided that accumulate a first order error in a single clock cycle. Some examples of circuitry and methodology steps have been given as examples to illustrate the invention. However, the invention is not limited to merely these examples. Likewise, the invention has been described in the context of binary numbers. However, the invention is not limited to any particular number base. Other variations and embodiments of the invention will occur to those skilled in the art.

We claim:
1. A method for first order accumulation of an error, the method comprising:
    accepting a gain value,
    in a first clock cycle, supplying a first accumulated value stored in a memory unit in a previous clock cycle to a first logic circuit that is operable to sum;
    in the first clock cycle, summing the gain value with the first accumulated value in the first logic circuit, creating a summed value;
    in a first clock cycle, in a second logic circuit that is operable to compare, comparing the summed value with an upper limit and a lower limit, and creating a correction signal in accordance with the comparing;
    in a first clock cycle, in a third logic circuit that is operable to subtract and add, creating a storage value in accordance with the comparing;
    in the first clock cycle, loading the storage value in the memory unit as a second accumulated value for use in a second clock cycle, subsequent to the first clock cycle.
2. The method of claim 1,
    wherein the creating a correction signal comprises:
        upon determination that the summed value is between the upper limit and the lower limit, creating a non-weighted correction signal;
        upon determination that the summed value is greater than the upper limit, creating a positive-weight correction signal; and
        upon determination that the summed value is less than the lower limit, creating a negative weight correction signal; and wherein further the creating a storage value comprises:
upon determination that the summed value is between the upper limit and the lower limit, creating a storage value equal to the summed value;
upon determination that the summed value is greater than the upper limit, subtracting the (upper limit+1) from the summed value, creating a first difference, and creating a storage value equal to the first difference; and
upon determination that the summed value is less than the lower limit, subtracting the lower limit from the summed value, creating a second different, and creating a storage value equal to the second difference.

3. The method of claim 1, wherein at least one of the first, the second and the third logic circuit is implemented as a combinational logic circuit.

4. The method of claim 1, wherein the memory unit is a register.

5. The method of claim 1 further comprising:
converting the gain value to a value less than, or equal to the upper limit and greater than, or equal to the lower limit.

6. The method of claim 2
wherein the gain value is an x-bit binary number and,
wherein further creating the summed value comprises creating the summed value of an (x+1)-bit binary number.

7. The method of claim 6 wherein further the gain value is a two's complement x-bit binary number with a sign bit in the most significant bit (MSB) position;
wherein creating the summed value comprises creating the summed value of a two's complement (x+1)-bit binary number with a sign bit in the MSB position; and,
wherein further the upper limit is a two's complement x-bit binary number with a sign bit in the MSB position and the lower limit is a two's complement x-bit binary number with a sign bit in the MSB position.

8. The method of claim 7 wherein the comparing the summed value with the upper limit and the lower limit comprises comparing the binary values in the 2 most significant bit (MSB) positions of the summed value.

9. The method of claim 8 wherein the creating the correction signal comprises creating a correction signal that comprises the binary values in the two MSB positions of the summed value.

10. The method of claim 9 wherein the creating the non-weighted correction signal comprises creating the non-weighted signal if the 2 MSB positions of the summed value are selected from a group consisting of "00" and "11";
wherein creating the positive weight correction signal comprises creating the positive weight correction signal if the 2 MSB positions of the summed value are "01"; and,
wherein creating the negative weight correction signal comprises creating the negative weight correction signal if the 2 MSB positions of the summed value are "10".

11. The method of claim 1 further comprising:
accepting a new gain value;
in the second clock cycle, in the first logic circuit, supplying the second accumulated value stored in the first clock cycle;
in the second clock cycle, summing the new gain value with the second accumulated value, creating a new summed value, comparing the new summed value to the upper and lower limits, creating a new correction signal, and creating a new storage value; and,
in the second clock cycle, loading the new storage value in the memory unit as a third accumulated value for use in a third clock cycle, subsequent to the second clock cycle.

12. A system for first order accumulation of an error, the system comprising:
a memory unit operable to accept a clock signal defining a first clock cycle, and in the first clock cycle, to supply a first accumulated value stored in a previous clock cycle;
logic circuitry including:
a first component circuitry operable to sum the first accumulated value and a gain value, and to create a summed value in the first clock cycle;
a second component circuitry operable to, in the first clock cycle, compare the summed value with an upper limit and a lower limit, and to create a correction signal in accordance with the comparing;
a third component circuitry operable to, in the first clock cycle, create a storage value in accordance with the comparing;
wherein the memory unit is operable to store the storage value as a second accumulated value for use in a second clock cycle, subsequent to the first clock cycle.

13. The system of claim 12,
wherein the first component circuitry is a summing module; the second component circuitry is a controller; and the third component circuitry is a storage value generator;
wherein creating the correction signal comprises:
creating a non-weighted correction signal, upon determination that the summed value is between the upper limit and the lower limit;
creating a positive-weight correction signal upon determination that the summed value is greater than the upper limit; and
creating a negative weight correction signal upon determination that the summed value is less than the lower limit; and,
wherein creating the storage value comprises:
upon determination that the summed value is between the upper limit and the lower limit, creating the storage value equal to the summed value;
upon determination that the summed value is greater than the upper limit, subtracting the (upper limit+1) from the summed value, creating a first difference, and creating the storage value equal to the first difference; and
upon determination that the summed value is less than the lower limit, subtracting the lower limit from the summed value, creating a second different, and creating the storage value equal to the second difference.

14. The system of claim 12 wherein the logic circuitry further comprises:
a limiter operable to accept the gain value, and to output a limited gain value less than, or equal to the upper limit and greater than, or equal to the lower limit.

15. The system of claim 14 wherein the limited gain value is an x-bit binary number, and wherein the first component circuitry is operable to create an (x+1)-bit binary number summed value.

16. The system of claim 15
wherein the limited gain value is a two's complement x-bit binary number with a sign bit in the most significant bit (MSB) position, and
wherein further the first component circuitry is further operable to create a two's complement (x+1)-bit binary number summed value with a sign bit in the MSB position;
wherein the upper limit is a two's complement x-bit binary number with a sign bit in the MSB position; and, wherein the lower limit is a two's complement x-bit binary number with a sign bit in the MSB position.

17. The system of claim 16 wherein the controller is further operable to create a correction signal comprising the two most significant bits (2 MSBs) of the summed value.

18. The system of claim 17 wherein the controller is further operable to create a non-weighted signal if the 2 MSBs of the summed value are selected from a group consisting of "00" and "11", to supply a positive weight correction signal if the 2 MSBs of the summed value are "01", and to supply a negative weight correction signal if the 2 MSBs of the summed value are "10".

19. The system of claim 12 wherein the memory unit is further operable to accept a second clock pulse defining a second clock cycle, and to supply the second accumulated value stored in the first clock cycle; and, wherein the logic circuitry, in the second clock cycle, is further operable to sum a new limited gain value with the second accumulated value, to create a new summed value, to compare the new summed value to the upper and lower limits, to create a new correction signal, and create a new storage value; and, wherein the memory unit is further operable to store new storage value as the third accumulated for use in a third clock cycle, subsequent to the second clock cycle.

20. The system of claim 16 wherein the third component circuitry is operable to generate a two's complement x-bit storage value by replacing the binary bit value in the xth bit place of the summed value with the binary bit value in the (x+1)th bit place.

21. The system of claim 12, wherein at least one of the summing module, the controller and the storage value generator is implemented as a combinational logic circuit; and wherein the memory unit is a register.

\* \* \* \* \*